(12) United States Patent
Pyke et al.

(10) Patent No.: US 7,753,212 B2
(45) Date of Patent: Jul. 13, 2010

(54) RECOVERY OF VALUABLE METALS

(75) Inventors: Brendan Pyke, Yokine (AU); Geoff Senior, Mount Claremont (AU); Scott Thomas, Mount Hawthorn (AU)

(73) Assignee: WMC Resources Ltd., Southbank, Victoria (AU)

( * ) Notice: Subject to any disclaimer, the term of this patent is extended or adjusted under 35 U.S.C. 154(b) by 1250 days.

(21) Appl. No.: 10/528,109

(22) PCT Filed: Sep. 16, 2003

(86) PCT No.: PCT/AU03/01210

§ 371 (c)(1),
(2), (4) Date: Jul. 1, 2005

(87) PCT Pub. No.: WO2004/024334

PCT Pub. Date: Mar. 25, 2004

(65) Prior Publication Data

US 2005/0242001 A1    Nov. 3, 2005

(30) Foreign Application Priority Data

Sep. 16, 2002  (AU) .............................. 2002951407

(51) Int. Cl.
  *B03D 1/008*  (2006.01)
  *B03D 1/012*  (2006.01)
  *B03D 1/02*   (2006.01)

(52) U.S. Cl. ...................................... 209/166; 209/167

(58) Field of Classification Search ................. 209/164, 209/166, 167
See application file for complete search history.

(56) References Cited

U.S. PATENT DOCUMENTS

| 3,735,931 A | * | 5/1973 | Weston | ........................ 241/20 |
| 3,919,079 A | * | 11/1975 | Weston | ....................... 209/166 |
| 5,411,148 A | | 5/1995 | Kelebek | |
| 6,170,669 B1 | | 1/2001 | Senior et al. | |

FOREIGN PATENT DOCUMENTS

WO    WO 02/070138    9/2002

* cited by examiner

*Primary Examiner*—Thomas M Lithgow
(74) *Attorney, Agent, or Firm*—Michael Best & Friedrich LLP

(57) ABSTRACT

A continuous flotation process and apparatus for iron-containing sulphides in ores and concentrates of ores are disclosed. The process includes adjusting the pH of an aqueous pulp of the ores or concentrates of the ores to be in the range of 6.5-8.5 and thereafter adding a reducing agent to modify an iron hydroxide film on the surface of iron-containing sulphides in the ores or ore concentrates to enable adsorption of a collector onto iron-containing sulphides. The process also includes adding the collector to the pulp prior to, during, or after adding the reducing agent. The process also includes aerating the pulp to increase the pulp potential to a level sufficient to allow collector adsorption onto the iron-containing sulphides and thereafter bubbling gas through the pulp and subjecting the aqueous pulp to froth flotation to produce a froth containing said sulphide containing minerals.

29 Claims, 3 Drawing Sheets

Grade/Recovery response for Slimes Column Tail with and without citric acid

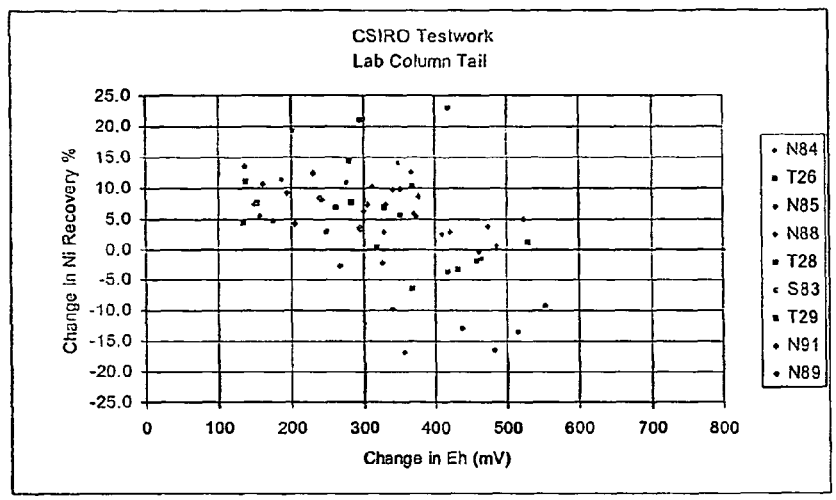
Figure 2: Ni recovery benefit as a function of Change in Pulp Potential for Slimes Column Tail tests
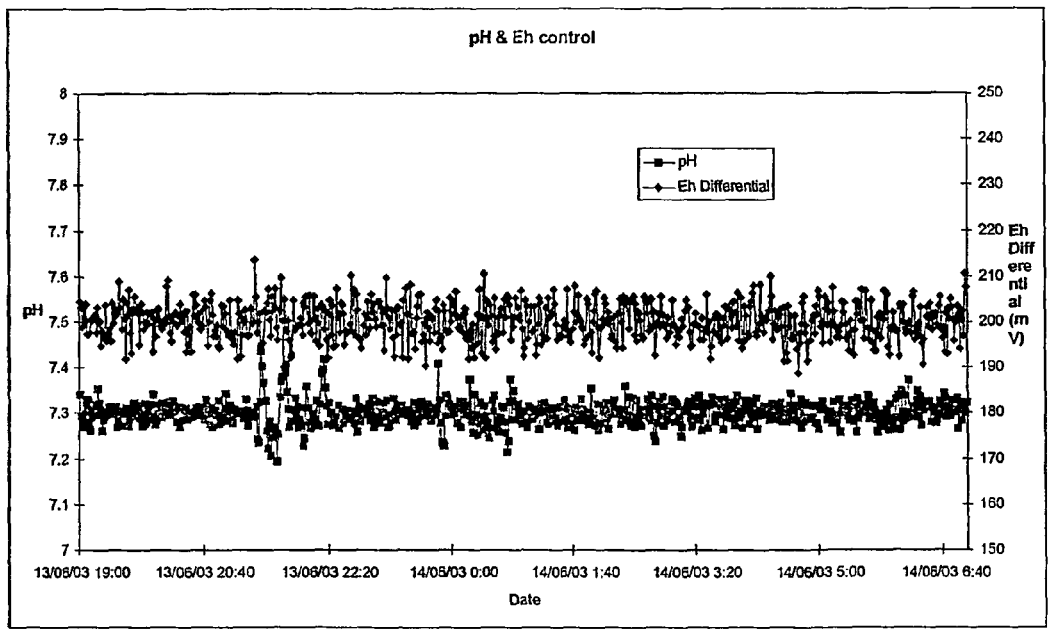
Figure 3: pH and Eh differential control at Slimes Column Tail 2 Conditioning Tank

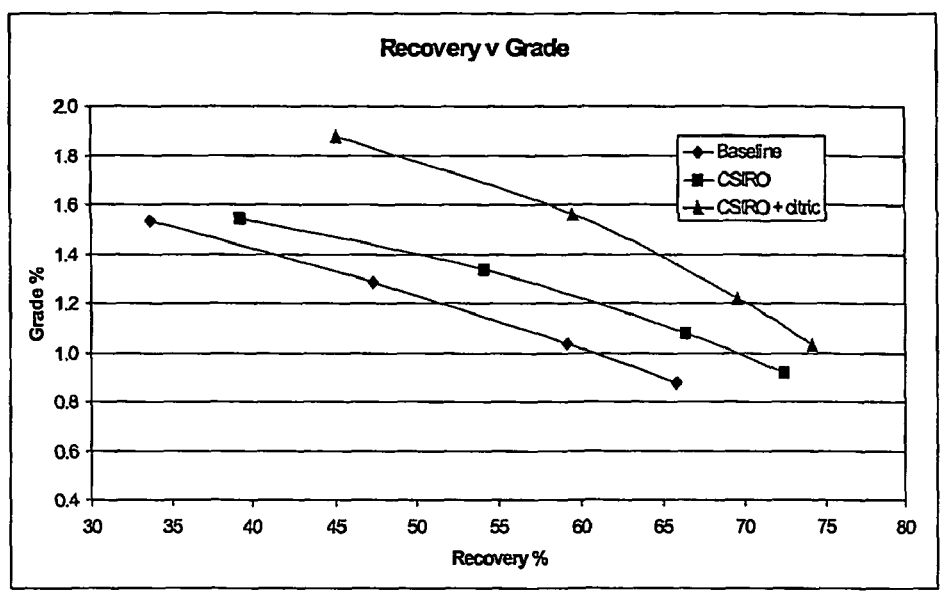
Figure 4: Grade/Recovery response for Slimes Column Tail with and without citric acid

RECOVERY OF VALUABLE METALS

This application claims benefit of International Patent Application No. PCT/AU2003/001210 filed 16 Sep. 2003, which claims priority of Australian Patent Application No. 2002951407 filed 16 Sep. 2002.

The present invention relates to a process for improving recovery of valuable metals from iron-containing sulphides in ores and concentrates.

In many parts of the world, valuable metals such as gold, nickel and platinum group metals occur in iron-containing sulphides such as pentlandite, pyrrhotite and arsenopyrite. These minerals are recovered selectively from the ores by flotation.

While flotation is an efficient process usually, one of its most significant limitations for iron-containing sulphides is that fine particles are not recovered efficiently and a great deal of fine valuable sulphides are lost to the tailings.

U.S. Pat. No. 6,170,669 (Senior et al) discloses a flotation process for iron-containing sulphide containing ores that is based on a finding of the inventors that a major reason that iron-containing sulphides float poorly at fine sizes (i.e. less than 130 micron) is that their surfaces are covered by an iron hydroxide film. This film prevents collector adsorption and renders the particles of iron-containing sulphides hydrophilic and poorly floatable with conventional sulphide flotation reagents.

The US patent discloses that the inventors believe that iron hydroxide films that are present in iron-containing sulphides consist of ferric hydroxide. The basis of the flotation process disclosed in the US patent is to strip the surface film for a time that is sufficient to allow collectors to adsorb onto the fine particles.

Specifically, the US patent discloses a flotation process for iron containing sulphides in ores that includes adding a reducing agent, such as an oxy-sulphur compound (preferably dithionite), to an aqueous pulp of an ore that contains iron-containing sulphides at a pH of 7-10. Addition of the reducing agent decreases the pulp potential and thereby reduces and solubilizes an iron hydroxide film on the surface of iron-containing sulphides. The flotation process also includes adding a collector to the pulp and thereafter aerating the pulp to increase the pulp potential to a level sufficient to allow collector adsorption to the sulphides and subsequent flotation of iron-containing sulphides. The floated iron-containing sulphides can then be treated as required to recover valuable metals, such as gold, nickel or platinum group metals.

The flotation process disclosed in the US patent is based on laboratory flotation test work that was carried out on a batch basis.

The applicant has carried out research and development work on the flotation process disclosed in the US patent to develop the process for industrial application for recovering nickel from iron-containing sulphide ores.

The outcome of the further research and development work is a continuous conditioning process and apparatus for application of the conditioning process for subsequent flotation.

The present invention provides a continuous flotation process for iron-containing sulphides in ores in order to facilitate recovery of valuable metals from the iron-containing sulphides.

The method includes continuous conditioning and flotation of an aqueous pulp of ores containing iron-containing sulphides.

In general terms, the process includes the following sequence of treatment steps on an aqueous pulp of ores or concentrates of ores:

(a) adjusting the pH of the pulp to be in the range of 6.5-8.5;

(b) adding a reducing agent to modify an iron hydroxide film on the surface of iron-containing sulphides in the ores to enable collector adsorption onto iron-containing sulphides;

(c) adding a collector to the pulp prior to, during, or after adding the reducing agent in step (b); and (d) aerating the pulp to increase the pulp potential to a level sufficient to allow collector adsorption onto the iron-containing sulphides; and (e) bubbling gas through the pulp and thereby subjecting the aqueous pulp to froth flotation to produce a froth containing said sulphide containing minerals.

Steps (a) to (d) are the conditioning steps and step (e) is the traditional flotation step.

The process also includes either one or both of the following steps.

One step is controlling the addition of the reducing agent in step (b) by reference to the change in pulp potential as the reducing agent is being added.

The other step is adding a complexant to the pulp prior to or during step (b) of adding the reducing agent to react with the reduced iron produced in step (b) to minimise iron hydroxide reforming a film on the iron-containing sulphides.

Preferably the iron-containing sulphides contain one or more valuable metals selected from the group that includes nickel, gold, or platinum group metals.

Preferably step (a) includes adjusting the pH of the aqueous pulp to be in the range of 7.0-8.0.

Preferably step (a) includes adjusting the pH of the aqueous pulp to be in the range of 7.1-7.5.

More preferably step (a) includes adjusting the pH of the aqueous pulp to be 7.3.

Preferably step (a) includes adjusting pulp pH by adding acid to the pulp.

Preferably the acid is sulphuric acid.

Preferably step (a) includes adjusting pulp pH as the pulp flows through a first tank.

More preferably step (a) includes controlling the flow of pulp through the first tank to be plug flow.

Preferably step (b) includes controlling the addition of the reducing agent by adding the reducing agent to the pulp to decrease the pulp potential by at least 150 mV.

Preferably step (b) includes controlling the addition of the reducing agent by adding the reducing agent to the pulp to decrease the pulp potential by at least 200 mV.

Preferably step (b) includes controlling the addition of the reducing agent by adding the reducing agent to the pulp to decrease the pulp potential by no more than 350 mV.

Preferably step (b) includes intensively mixing the pulp while adding the reducing agent.

Preferably step (b) includes adding the reducing agent to the pulp as the pulp flows through a second tank.

Preferably the reducing agent is an oxy-sulphur compound which dissociates in the aqueous media to form oxy-sulphur ions having the general formula $S_nO_Y^{z-}$ where n is greater than 1; y is greater than 2; and z is the valance of the ion.

Preferably the oxy-sulphur compound is dithionite.

Preferably the complexant is selected from the group that includes citric acid and oxalic acid.

More preferably the complexant is citric acid.

Preferably the process includes adding the complexant to the pulp during step (b) of adding the reducing agent to the pulp.

More preferably the process includes adding the complexant to the pulp during step (b) of adding the reducing agent to the pulp as the pulp flows through the second tank.

Preferably step (c) includes adding collector that is selected from the group that includes xanthates, dixanthogen, xanthate esters, dithiophosphates, dithiocarbamates, thionocarbamates, and mercaptans.

More preferably the collector is a xanthate.

Preferably step (c) includes adding the collector to the pulp during step (b) of adding the reducing agent to the pulp.

More preferably step (c) includes adding the collector to the pulp during step (b) of adding the reducing agent to the pulp as the pulp flows through the second tank.

Preferably the process includes controlling the process so that the average residence time of pulp flowing through the second tank is less than 45 seconds.

More preferably the process includes controlling the process so that the average residence time of pulp flowing through the second tank is approximately 30 seconds.

Preferably the process includes controlling the flow of pulp through the second tank to be plug flow.

Preferably step (d) includes aerating the pulp downstream of the second tank.

Preferably step (e) includes separating the froth of floated iron-containing sulphides from the pulp and thereafter recovering valuable metals from the froth.

According to the present invention there is also provided an apparatus for continuously conditioning iron-containing sulphides in ores in order to facilitate recovery of valuable metals from the flotable iron-containing sulphides, which apparatus includes:

(a) a first tank for adjusting the pH of an aqueous pulp of the ores containing iron-containing sulphides as the pulp flows through the tank, the first tank having an inlet for receiving a flow of pulp and an outlet for discharging a flow of pH-adjusted pulp;

(b) a second tank for adding a reducing agent and a collector to the pH-adjusted pulp as the pulp flows through the tank, the second tank having an inlet for receiving the flow of pH-adjusted pulp from the first tank, an outlet for discharging a flow of treated pulp from the second tank, a means for adding the reducing agent to the second tank, a means for adding the collector to the second tank, and a means for intensively mixing the pulp in the tank; and (c) a means for aerating the treated pulp from the second tank to allow adsorption of the collector onto the iron-containing sulphides surface.

Preferably the second tank also includes a means for adding a complexant into the second tank.

Preferably the inlet for the pH-adjusted pulp is in the lower section of the second tank and the outlet for treated pulp is in an upper section of the second tank.

With this arrangement, preferably the second tank includes a partition that divides the tank into a lower chamber and an upper chamber and the partition has a central opening that allows flow of pulp between the chambers. The purpose of the partition is to promote upward plug flow of pulp through the second tank.

Preferably the means for adding the reducing agent, the collector, and the complexant to the second tank are adapted to add these reagents to the lower chamber, whereby in use there is thorough mixing of the pulp and the reagents in the lower chamber and plug flow of the pulp and the reagents upwardly through the chambers.

Preferably the first tank includes a means for venting air from the tank.

Preferably the means for aerating the pulp from the second tank includes a launder having an aeration screen located at the outlet of the second tank.

The present invention is described further by reference to the accompanying drawings of which:

FIG. 2 is a graph that illustrates nickel recovery versus pulp potential in testwork carried out by the applicant;

FIG. 3 is a graph that illustrates potential (measured as Eh) and pH differential control in testwork carried out by the applicant; and FIG. 4 is a graph that illustrates grade versus recovery for testwork carried out by the applicant.

Figure 1:
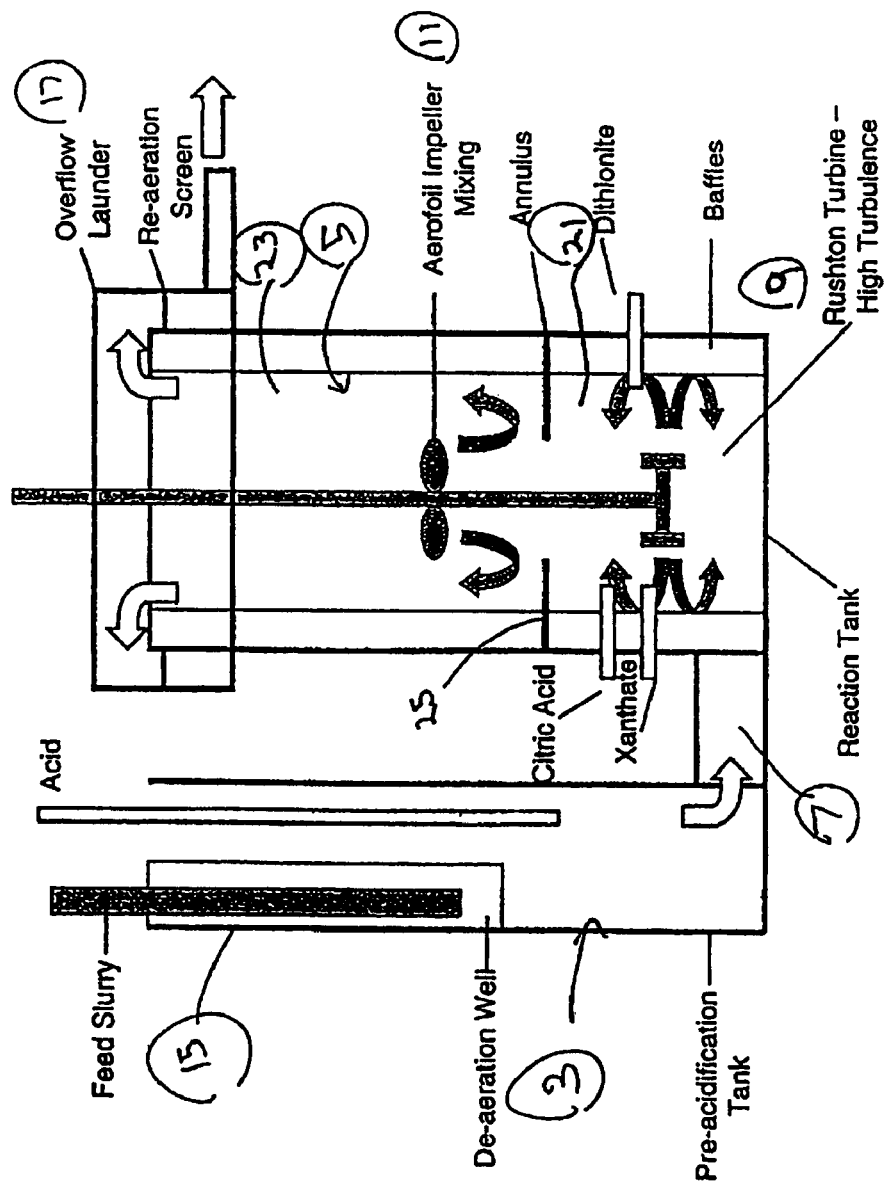
FIG. 1 is a schematic diagram of a preferred embodiment of a flotation apparatus in accordance with the present invention.

As is indicated above, the process and apparatus of the present invention were invented in the course of research and development work carried out by the applicant.

The focus of the work was to improve recovery of nickel from fines and slimes streams in a flotation plant for iron-containing nickel-bearing ores.

The work investigated the potential application of the laboratory-based findings of the US patent to the flotation plant.

The work established that the flotation process disclosed in the US patent:

(a) could deliver improved recovery of nickel from the targeted fines and slimes streams in the flotation plant; and (b) could be simplified to improve process operation, reduce reagent costs, increase time of effect, and be operated on a continuous basis.

The work established that important factors in operating the flotation process on a continuous basis include:

(a) using change in pulp potential as a parameter for controlling the addition of reducing agent (such as dithionite)—this is a different approach to using absolute pulp potential as proposed in the US patent;

(b) the addition of citric acid leads to increased recovery benefit and increases the lasting effect of the process;

(c) using a specific design of apparatus that is based on two separate tanks to reduce reagent consumptions via minimisation of entrapped air consuming the reductant, low pH regions decomposing reductant, and increase process control by reducing pulp short-circuiting.

The specific embodiment of the apparatus in accordance with the invention that was developed in the work is shown in FIG. 1.

The apparatus includes a first tank 3 and a second tank 5 that are interconnected by a transfer pipe 7 extending between the lower sections of the tanks 3, 5.

The first tank 3 includes an inlet 15 for an aqueous slurry of pulp to be treated in the upper section of the tank 3 and the second tank includes an outlet for treated pulp in the upper section of the second tank 5. The outlet is in the form of an overflow launder 17.

It can be appreciated from the drawing that pulp supplied to the inlet 15 of the first tank 3 flows downwardly through the tank 3 and from the tank 3 via the transfer pipe 7 and into the lower section of the second tank 5. Thereafter, the pulp flows upwardly through the second tank 5 and from the tank 5 via the overflow launder 17.

The second tank 5 is divided into a lower chamber 21 and an upper chamber 23 by means of a horizontal partition 25 that has a central opening that allows movement of pulp between the chambers.

The second tank 4 further includes a turbine 9 to generate turbulent mixing of pulp in the lower chamber 21 and an aerofoil impeller 11 to generate further mixing of pulp in a lower section of the upper chamber 23.

The second tank further includes baffles 18 to minimise the formation of a vortex and the subsequent entrainment of air into the tank that could result in decomposition of sodium dithionite.

The apparatus further includes a means for supplying reagents to the first and second tanks 3, 5. Specifically, the apparatus includes means for supplying acid (such as sulphuric acid) into the first tank 3, means for supplying a reducing agent (such as dithionite) into the second tank 5, means for supplying a collector (such as a xanthate) into the second tank 5, and means for supplying a complexant (such as citric acid) into the second tank 5.

The above-described arrangement of the two chambers 21, 23 defined by the horizontal partition 25, the turbine 9, the impeller 11, and the means for supplying the reducing agent, conditioner and complexant to the lower chamber 21 promote plug flow of pulp upwardly through the second tank 5 with thorough mixing of the pulp and the reagents in the lower chamber 21 and sufficient reaction time for the pulp and the reagents as the pulp moves upwardly through the lower chamber 21 and the upper chamber 23 with minimal risk of short-circuiting of pulp/reactants.

The apparatus further includes a means for aerating pulp upon exiting the second tank in the form of an aeration screen 13 in the overflow launder 17.

The research and development work mentioned above investigated the impact of a specific embodiment of the process in accordance with the invention on the Slimes Rougher Tail stream within the WMC Mount Keith flotation circuit.

The embodiment of the process is hereinafter referred to as the "Fine Float Process" and is described below under the heading "Stage Recovery Improvement".

The following three steps were used in the work to evaluate the Fine Float Process.

First, a Stage Recovery Improvement with the Fine Float Process was determined using comparative laboratory tests. The test work was conducted over a range of ore types.

Second, a Cleaner Stage Evaluation with the Fine Float Process was undertaken using comparative laboratory tests.

Third, Pilot Plant Testwork on the Fine Float Process was conducted to assess scale up from laboratory to pilot plant and allow prediction of full scale plant performance. This phase of the work allowed confirmation of reagent consumption in continuous operation.

Stage Recovery Improvement—Laboratory Results

In brief, the Fine Float Process evaluated in the work involves the following four steps:

Addition of sulphuric acid to pH 7.3.
Addition of sodium dithionite to decrease the pulp potential by 200 mV.
Addition of citric acid and xanthate.
Aeration of pulp to increase the pulp potential.
Commence flotation test in standard laboratory equipment.
Baseline laboratory flotation tests on column tailings resulted in an average Ni recovery of 48.0% at a grade of 1.0% from a feed grade of 0.30% Ni. The baseline tests provided the comparative base for the subsequent tests on the Fine Float Process.

Thirty-six paired laboratory tests were conducted to determine the effect of applying the Fine Float Process on the Ni recovery and grade. The comparative tests were conducted over a range of ore types presented to the plant. Each Fine Float Process test was compared to a corresponding baseline test with the difference in Ni recovery and grade determined.

The average Ni recovery and grade benefit of 36 paired tests, associated with application of the Fine Float Process, was 11.7% (±1.5%) and 0.2% (±0.6%), respectively.

Cleaner Stage Evaluation

Rougher-Cleaner tests indicated that one application of the Fine Float Process to the Slimes Rougher Tail circuit increased recovery by approximately 10% from 55.9% to 66.1%.

Subsequent cleaner flotation of that concentrate resulted in a cleaner stage recovery increase of 13.6% from 70.8% to 84.4%.

The overall recovery increased from 39.6% to 55.8% at concentrate grades of 4.4% and 7.9% respectively.

Pilot Plant Testwork

A pilot plant was used to evaluate scale-up of the Fine Float Process from laboratory to pilot plant and to allow prediction of full scale plant performance.

A scaled version of the conditioning vessel was used in this testwork and reagent addition was controlled automatically to pulp potential and pH. The stream from the Slimes Rougher Tail circuit was also selected for this work.

The recovery and grade benefit obtained in pilot plant testing for 7 ore types (32 paired tests), via application of the Fine Float Process, was 9.7% (±3.7%) at an average Ni grade increase of 0.0% (±0.1%).

These results are presented below in Table 1.

TABLE 1

| Comparison of results in pilot plant with and without Fine Float Process | | |
|---|---|---|
| | Ni Recovery % | Ni Grade % |
| Baseline | 45.4 | 0.76 |
| Fine Float Process | 55.1 | 0.76 |

In summary:

Application of the Fine Float Process in laboratory work significantly increased stage recovery of slimes particles over a range of ore types.

In addition to a rougher stage improvement, the Fine Float Process was found to impart a sustained recovery improvement in subsequent flotation stages.

The laboratory results were scaled to a continuous pilot plant increasing confidence in predicting plant performance. The conditioning vessel provided a means of applying and controlling the chemical process.

In addition to the above, the research and development work mentioned above investigated the impact of three particular parameters of the process in accordance with the invention on flotation performance. The parameters are:

(a) controlling the addition of reducing agent by reference to change in pulp potential;
(b) controlling the pH to be in the range of 6.5-8.5; and
(c) adding a complexant to minimise iron hydroxides reforming a film on iron-containing sulphides.

The following summarises the results of the work in relation to these parameters.

Controlling Potential and pH

It was established that the recovery benefit of the Fine Float Process is dependent on achieving a change in potential preferably of the order of 150-250 mV, as measured by Eh.

Testwork results are presented in FIG. 2.

FIG. 2 indicates that maximum recovery was achieved with a potential differential of 200 mV.

FIG. 2 also indicates that the increase in potential was lower at potential differences either lower or higher than 150-250 mV and that there was a recovery loss at very high potential differences.

It was also established that the recovery benefit of the Fine Float Process is dependent on the pH being controlled tightly around 7.3.

Initial pilot testwork using a simple stirred tank apparatus was unable to achieve the required control of potential and pH and as a result the Fine Float Process did not increase recovery. This result lead to the development of the embodiment of the apparatus of the invention shown in FIG. 1.

Results of the subsequent pilot plant work on the apparatus shown in FIG. 1 showed it was possible to control potential and pH and as such achieve the targeted recovery improvement.

FIG. 3 contains a plot of pH and Eh differential as a function of time in a full scale application. The pH was controlled to 7.3+/−0.06 and the Eh differential was controlled to 200+/−20 mV.

FIG. 3 demonstrates that the apparatus enabled tight pH and Eh differential control and subsequently optimum reagent addition control.

Complexant—Citric Acid

Laboratory flotation tests indicated that the recovery benefit of the initial process described in the US patent was enhanced by the addition of citric acid as shown in FIG. 4.

It is thought the citric acid acts as a completing agent binding the iron ions which are solubilised in the lower potential and pH environment.

Many modifications may be made to the embodiments of the process and apparatus of the present invention described above without departing from the spirit and scope of the invention.

The invention claimed is:

1. A continuous flotation process for iron-containing sulphides in ores and concentrates of ores includes the following steps:
   (a) adjusting the pH of an aqueous pulp of the ores or concentrates of the ores to be in the range of 6.5-8.5;
   (b) adding a reducing agent to modify an iron hydroxide film on the surface of iron-containing sulphides in the ores or ore concentrates to enable adsorption of a collector onto iron-containing sulphides;
   (c) adding the collector to the pulp prior to, during, or after adding the reducing agent in step (b);
   (d) aerating the pulp to increase the pulp potential to a level sufficient to allow collector adsorption onto the iron-containing sulphides;
   (e) bubbling gas through the pulp and thereby subjecting the aqueous pulp to froth flotation to produce a froth containing said sulphide containing minerals; and
   (f) adding a complexant to the pulp prior to or during step (b) to minimize iron hydroxide reforming a film on the iron-containing sulphides.

2. The process defined in claim 1 includes controlling the addition of the reducing agent in step (b) by reference to the change in pulp potential as the reducing agent is being added in step (b).

3. The process defined in claim 1 wherein step (e) includes separating the froth of floated iron-containing sulphides from the pulp and thereafter recovering valuable metals from the froth.

4. The process defined in claim 1 wherein the iron-containing sulphides contain one or more valuable metals selected from the group that includes nickel, gold, or platinum group metals.

5. The process defined in claim 1 wherein step (a) includes adjusting the pH of the aqueous pulp to be in the range of 7.0-8.0.

6. The process defined in claim 5 wherein step (a) includes adjusting the pH of the aqueous pulp to be in the range of 7.1-7.5.

7. The process defined in claim 1 wherein step (a) includes adjusting pulp pH by adding acid to the pulp.

8. The process defined in claim 1 wherein step (a) includes adjusting pulp pH as the pulp flows through a first tank.

9. The process defined in claim 1 wherein step (a) includes controlling the flow of pulp through the first tank to be plug flow.

10. The process defined in claim 1 wherein step (b) includes controlling the addition of the reducing agent by adding the reducing agent to the pulp to decrease the pulp potential by at least 150 mV.

11. The process defined in claim 10 wherein step (b) includes controlling the addition of the reducing agent by adding the reducing agent to the pulp to decrease the pulp potential by at least 200 mV.

12. The process defined in claim 1 wherein step (b) includes controlling the addition of the reducing agent by adding the reducing agent to the pulp to decrease the pulp potential by no more than 350 mV.

13. The process defined in claim 1 wherein step (b) includes intensively mixing the pulp while adding the reducing agent.

14. The process defined in claim 1 wherein step (b) includes adding the reducing agent to the pulp as the pulp flows through a second tank.

15. The process defined in claim 1 wherein the reducing agent is an oxy-sulphur compound which dissociates in the aqueous media to form oxy-sulphur ions having the general formula $$S_nO_y^{z-}$$

where n is greater than 1; y is greater than 2; and z is the valance of the ion.

16. The process defined in claim 15 wherein the oxy-sulphur compound is dithionite.

17. The process defined in claim 1 wherein the complexant is selected from the group consisting of citric acid and oxalic acid.

18. The process defined in claim 17 wherein the complexant is citric acid.

19. The process defined in claim 1 includes adding the complexant to the pulp during step (b) of adding the reducing agent to the pulp.

20. The process defined in claim 1 includes adding the complexant to the pulp during step (b) of adding the reducing agent to the pulp as the pulp flows through the second tank.

21. The process defined in claim 1 wherein the collector is selected from the group that includes xanthates, dixanthogen, xanthate esters, dithiophosphates, dithiocarbamates, thionocarbamates, and mercaptans.

22. The process defined in claim 21 wherein the collector is a xanthate.

23. The process defined in claim 1 wherein step (c) includes adding the collector to the pulp during step (b) of adding the reducing agent to the pulp.

24. The process defined in claim 23 wherein step (c) includes adding the collector to the pulp during step (b) of adding the reducing agent to the pulp as the pulp flows through the second tank.

25. The process defined in claim 1 includes controlling the process so that the average residence time of pulp flowing through the second tank is less than 45 seconds.

26. The process defined in claim 25 includes controlling the process so that the average residence time of pulp flowing through the second tank is approximately 30 seconds.

27. The process defined in claim 1 includes controlling the flow of pulp through the second tank to be plug flow.

28. The process defined in claim 1 wherein step (d) includes aerating the pulp downstream of the second tank.

29. A continuous flotation process for iron-containing sulphides in ores and concentrates of ores includes the following steps:
   (a) adjusting the pH of an aqueous pulp of the ores or concentrates of the ores to be in the range of 6.5-8.5;
   (b) adding a reducing agent to modify an iron hydroxide film on the surface of iron-containing sulphides in the ores or ore concentrates to enable adsorption of a collector onto iron-containing sulphides;
   (c) adding the collector to the pulp prior to, during, or after adding the reducing agent in step (b);
   (d) aerating the pulp to increase the pulp potential to a level sufficient to allow collector adsorption onto the iron-containing sulphides;
   (e) bubbling gas through the pulp and thereby subjecting the aqueous pulp to froth flotation to produce a froth containing said sulphide containing minerals;
   (f) adding a complexant to the pulp prior to or during step (b) to minimize iron hydroxide reforming a film on the iron-containing sulphides
wherein the complexant is selected from the group consisting of citric acid and oxalic acid.

* * * * *